Dec. 20, 1949     H. E. HANSEN     2,491,974
DRIVE FOR MOVING STAIRWAYS
Filed May 7, 1946
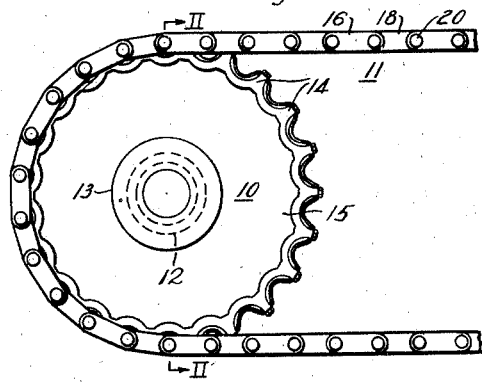
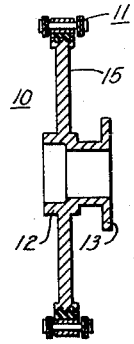
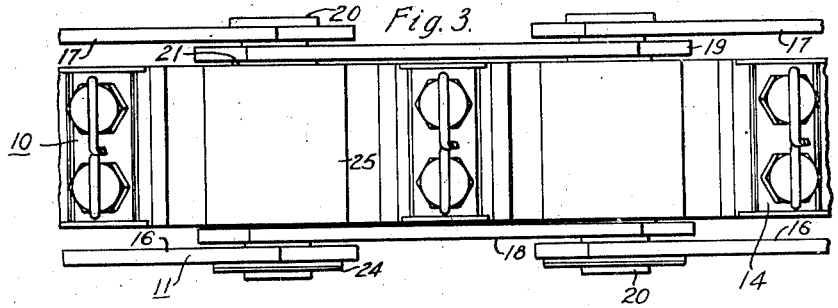
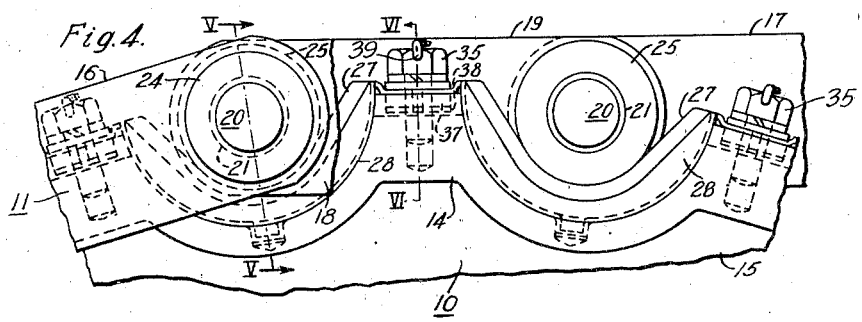
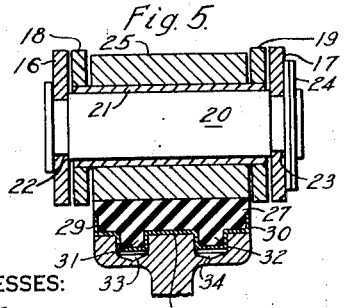
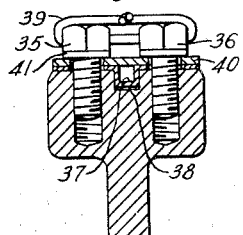
WITNESSES:
INVENTOR
Hans E. Hansen.
BY
ATTORNEY Patented Dec. 20, 1949

2,491,974

UNITED STATES PATENT OFFICE 2,491,974

DRIVE FOR MOVING STAIRWAYS

Hans E. Hansen, New York, N. Y., assignor to Westinghouse Electric Corporation, East Pittsburgh, Pa., a corporation of Pennsylvania Application May 7, 1946, Serial No. 667,841

6 Claims. (Cl. 74—243)

My invention relates to drives for moving stairways, and more particularly, to the sprocket wheels and sprocket chains for operating moving stairways.

One object of my invention is to provide a silent driving mechanism for the operation of moving stairways.

Another object is to provide a driving mechanism for moving stairways which will distribute the load more evenly over the teeth of the driving sprockets and thereby reduce the wear of the sprocket wheels and sprocket chains, as well as the noise usually made by their operation.

A further object is to provide a driving mechanism which will equalize the forces set up in the sprocket chains as they move to the teeth in the sprocket wheels on which they operate.

It is also an object to provide for damping the blow which occurs every time a roller on the sprocket chain enters a sprocket tooth and thus provide for reducing the noise usually made by such entry.

For a better understanding of the invention, reference may be had to the accompanying drawing in which:

Figure 1 is a view in side elevation of a sprocket wheel and a portion of the sprocket chain operated thereby for driving a moving stairway.

Fig. 2 is a view taken on the line II—II of Fig. 1.

Fig. 3 is an enlarged top plan view taken at the central section of the sprocket wheel and chain of Fig. 1.

Fig. 4 is a view in side elevation of the section of the sprocket wheel and chain shown in Fig. 3, with part of the links broken away to show the construction of the sprocket teeth more clearly.

Fig. 5 is a view taken on the line V—V of Fig. 4, and

Fig. 6 is a view taken on the line VI—VI of Fig. 4.

Referring more particularly to Figs. 1 and 2 of the drawing, I have illustrated a driving sprocket wheel 10 and a portion of a sprocket chain 11 driven thereby. The sprocket wheel 10 is provided with a hub 12 by which it may be mounted on a driving axle (not shown) and a flange 13 by which it may be bolted to the driving axle. A plurality of teeth 14 are disposed on the outer periphery of the web 15 of the sprocket wheel for engaging and driving the sprocket chain.

As illustrated in Figs. 3 to 6, the sprocket chain has a plurality of outer links 16 and 17, a plurality of inner links 18 and 19, and a plurality of link pins 20 for joining the adjacent ends of the outer links to the adjacent ends of the inner links.

A sleeve 21 is rotatably mounted on the central portion of each of the pins 20 in position for supporting and providing a bearing for the ends of the inner links 18 and 19. The ends of the outer links 16 and 17 are disposed in grooves 22 and 23 in the outer ends of the pins 20, and the ends of the pins are peened to hold the outer links in position thereon. An adjusting washer 24 is disposed on the one end on each of the pins 20 which may take up any looseness which may develop by wear. A roller 25 is rotatably mounted on each of the sleeves 21 to enable the chain to ride easily on the sprocket wheel and reduce the friction and wear between the chain and wheel.

In order to dampen the blow which occurs every time a chain roller enters a sprocket tooth and also to equalize the forces set up by the chain, I have provided a non-metallic or resilient face insert 27, such as synthetic rubber or molded textile phenolic condensation product for each of the valleys between the sprocket teeth for receiving and supporting the rollers 25 of the chain.

When synthetic rubber is used, it is bonded or otherwise securely fastened on an approximately semi-cylindrical body 28, preferably of sheet steel punching or stamping, the central portion of which fits into the valley between adjacent teeth. Each sheet steel stamping or body is provided with upwardly turned flanges 29 and 30 at its sides for bracing and supporting the rubber insert 27 on the body and with a pair of bosses 31 and 32 which are disposed to extend downwardly and into a pair of recesses or apertures 33 and 34 in the bottom of the valley between the teeth with which it is used.

Each end of each stamping is bent over and provided with a slotted or apertured portion to extend under a pair of screw bolts 35 and 36 which are screwed into the outer ends of the adjacent teeth and thereby hold the stampings in place. Each end of each stamping is also provided with a downwardly extending boss 37 disposed to enter a groove or slot 38 on each of the sprocket teeth for the purpose of aligning and maintaining the stampings in position. The tops of the bolts 35 and 36 are drilled and tied with a wire 39 to prevent them from working loose while the sprocket wheel and chain are in operation. A holding washer 40 and a lock washer 41 are disposed under the heads of the screw bolts at each tooth to assist in clamping the ends of the stampings in place.

When the sprocket wheel and sprocket chain are in operation, the rollers 25 enter the valleys between the teeth and rest on and are moved forward by the resilient facings or inserts between the teeth as the chain is carried around the wheel.

By the foregoing description, it will be seen that I have provided resilient facings for the valleys between the teeth on sprocket wheels for engaging and operating the sprocket chains associated therewith; that the facings will so receive the chain rollers on the sprocket wheel that they will dampen the blows delivered by the rollers to the sprocket wheel and thereby reduce the noise of operation, and that the resilient inserts will tend to equalize the forces set by the sprocket chain as it passes over the sprocket wheel.

Although I have illustrated and described only one specific embodiment of my invention, it is to be understood that many modifications thereof and changes therein may be made without departing from the spirit and scope of the invention.

I claim as my invention:

1. In a sprocket drive for a moving stairway, a sprocket chain for operating the stairway, a sprocket wheel for the chain, said wheel having a plurality of teeth, each of the teeth having an aperture, a body disposed to fit in each valley between the teeth, having its ends bent over and provided with bosses disposed to fit into the apertures of the adjacent teeth, means for clamping the bodies in the valleys between the teeth, and a synthetic rubber material bonded to the outer face of each body for engaging the sprocket chain to reduce the noise of operation.

2. In a sprocket drive for a moving stairway, a sprocket chain for operating the stairway, a sprocket wheel for the chain, said wheel having a plurality of teeth, a body disposed to fit in each valley between the teeth, said body having bent-over ends, a plurality of bolts for removably clamping the ends of the body to the outer ends of the teeth, and a non-metallic, resilient material bonded to the outer face of each body and removable therewith from the wheel for engaging the sprocket chain to reduce the noise of operation.

3. In a sprocket drive for a moving stairway, a sprocket chain for operating the stairway, a sprocket wheel for the chain, said wheel having a plurality of teeth with an aperture in each tooth, a body disposed to fit in each valley between the teeth, having its ends bent over and provided with bosses disposed to fit into the apertures of adjacent teeth, a plurality of bolts for clamping the ends of the body to the outer ends of the teeth, and a synthetic rubber material bonded to the outer face of each body for engaging the sprocket chain to reduce the noise of operation.

4. In a sprocket drive for a moving stairway, a sprocket chain for operating the stairway, a sprocket wheel for the chain, said wheel having a plurality of teeth with an aperture in each tooth and an aperture in the central portion of each valley between the teeth, a body disposed to fit in each valley, each body having a boss on its central portion disposed to fit into the cooperating aperture in said valley and having its ends bent over and provided with bosses disposed to fit into the apertures of the adjacent teeth, a plurality of screw bolts for clamping the ends of the body to the outer ends of the teeth, and a resilient, non-metallic material bonded to the outer face of each body for engaging the sprocket chain to reduce the noise of operation.

5. In a sprocket drive for a moving stairway, a sprocket chain for operating the stairway, a sprocket wheel for the chain, said wheel having a plurality of teeth with an aperture in each tooth and an aperture in the central portion of each valley between the teeth, a body disposed in each valley, each body being curved to fit in the valley in which it is disposed and having a boss on its central portion disposed to fit into the cooperating aperture in said valley and having its ends bent over and slotted and provided with bosses disposed to fit into the apertures of the adjacent teeth, a plurality of screw bolts for clamping the slotted ends of the body to the outer ends of the teeth, and a synthetic rubber material bonded to the outer face of each body for engaging the sprocket chain to reduce the noise of operation.

6. In a sprocket drive for a moving stairway, a sprocket chain for operating the stairway, said chain having rollers on its link pins, a sprocket wheel for the chain, said wheel having a plurality of teeth with an aperture in each tooth and a plurality of apertures in the central portion of each valley between the teeth, a body disposed in each valley, each body being curved to fit in the valley in which it is disposed and having a plurality of bosses on its central portion disposed to fit into the cooperating apertures in said valley and having its ends bent over and slotted and provided with bosses disposed to fit into the apertures of the adjacent teeth, and having upturned flanges, a plurality of screw bolts for clamping the slotted ends of the body to the outer ends of the teeth, and a synthetic rubber material bonded to the outer face of each body and between the upturned flanges thereon for engaging the rollers on the sprocket chain to reduce the noise of operation.

HANS E. HANSEN.

REFERENCES CITED

The following references are of record in the file of this patent:

UNITED STATES PATENTS

| Number | Name | Date |
|---|---|---|
| 1,870,801 | Engstrom | Aug. 9, 1932 |
| 2,374,644 | Bombardier | May 1, 1945 |